United States Patent [19]

Buddenberg

[11] Patent Number: 4,815,925

[45] Date of Patent: Mar. 28, 1989

[54] CIRCULAR STORAGE CONTAINER FOR GRANULAR MATERIALS WITH A VERTICALLY MOVABLE LATERAL CONVEYOR

[75] Inventor: Jörg W. Buddenberg, Moers, Fed. Rep. of Germany

[73] Assignee: AJO Anlagentechnik GmbH & Co. KG, Freudenberg-Oberfischbach, Fed. Rep. of Germany

[21] Appl. No.: 853,808

[22] PCT Filed: Jun. 22, 1985

[86] PCT No.: PCT/EP85/00302

§ 371 Date: Mar. 13, 1986

§ 102(e) Date: Mar. 13, 1986

[87] PCT Pub. No.: WO86/00872

PCT Pub. Date: Feb. 13, 1986

[30] Foreign Application Priority Data

Jul. 25, 1984 [DE] Fed. Rep. of Germany ..... 34274103

[51] Int. Cl.$^4$ .............................................. B65G 65/38
[52] U.S. Cl. ..................... 414/302; 414/311; 414/317
[58] Field of Search .............. 414/298, 299, 300, 301, 414/302, 310, 313, 317, 319, 320, 311, 326

[56] References Cited

U.S. PATENT DOCUMENTS

| | | | |
|---|---|---|---|
| 2,500,043 | 3/1950 | Radtke | 414/320 X |
| 2,907,501 | 10/1959 | Laird | |
| 3,232,457 | 2/1966 | Bernstein et al. | 414/300 X |
| 3,358,856 | 12/1967 | Weibull | 414/317 X |
| 3,513,995 | 5/1970 | Stroker | 414/317 |
| 3,554,392 | 1/1971 | Ivestedt | 414/317 |
| 3,713,552 | 1/1973 | Schnyder | 414/302 X |
| 3,802,583 | 4/1974 | Tinsley et al. | 414/311 |
| 4,138,021 | 2/1979 | McKenzie | 414/298 |
| 4,487,542 | 12/1984 | Johanning et al. | 414/298 X |
| 4,564,317 | 1/1986 | Farber | 414/319 X |
| 4,645,403 | 2/1987 | DeWit | 414/320 X |

FOREIGN PATENT DOCUMENTS

| | | | |
|---|---|---|---|
| 63083 | 7/1892 | Fed. Rep. of Germany | 414/299 |
| 1145550 | 9/1963 | Fed. Rep. of Germany | |
| 1933337 | 1/1971 | Fed. Rep. of Germany | |
| 2801715 | 7/1979 | Fed. Rep. of Germany | 414/302 |
| 74828 | 4/1984 | Japan | 414/313 |
| 194939 | 11/1984 | Japan | 414/319 |
| 8103486 | 7/1981 | Netherlands | 414/298 |
| 2133393A | 7/1984 | United Kingdom | 414/319 |

OTHER PUBLICATIONS

Newsletter, Surrey Iron Works Ltd. 82-1.
Holland Quarterly 82/4, p. 10.

Primary Examiner—Peter A. Aschenbrenner
Assistant Examiner—Thomas A. Rendos
Attorney, Agent, or Firm—Townsend & Townsend

[57] ABSTRACT

A circular storage container (1) for granular materials is provided with a central support column (4) for a top-loading filling device (9) and a lateral conveyor (20) for pivotal movement around the support column (4). The lateral conveyor (20) is connected to the filling device via a telescopic, vertically extendable feed pipe (12). The support column (4) is constructed either of ring plates (5) or a helically coiled band, both of which have a downward slanting, angular outer edge section (34). The granule material dropped in the vicinity of the support column (4) slides onto the ring plates (5) or along the helically coiled band according to the shape of its alluvial cone, but cannot drop into the discharge shaft. During the removal process the granular material is forced between the ring plates (5) or between the coils of the helically coiled band, from where it drops into the discharge shaft (7). To prevent clogging during fill removal the outer edges (34) are angular in cross-section with the apex (35) of the angle projecting outwardly.

12 Claims, 3 Drawing Sheets

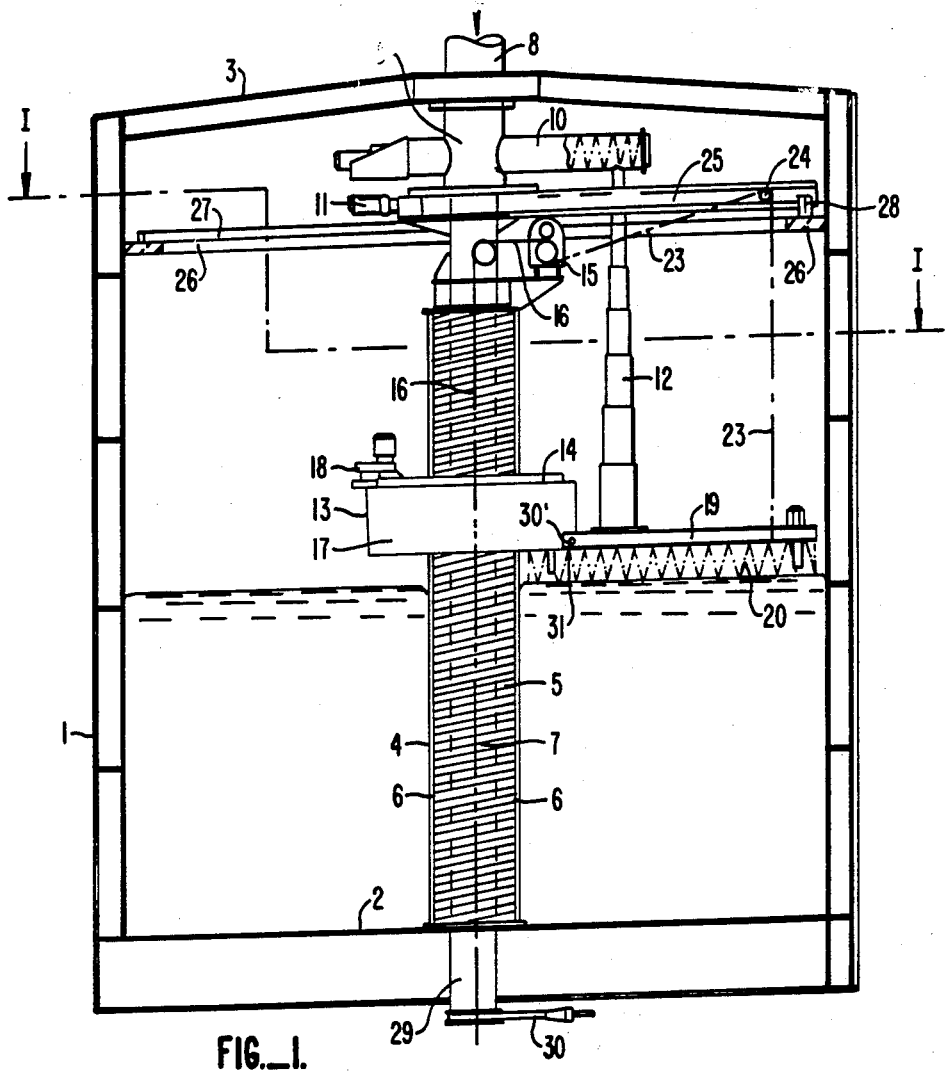
FIG._1.
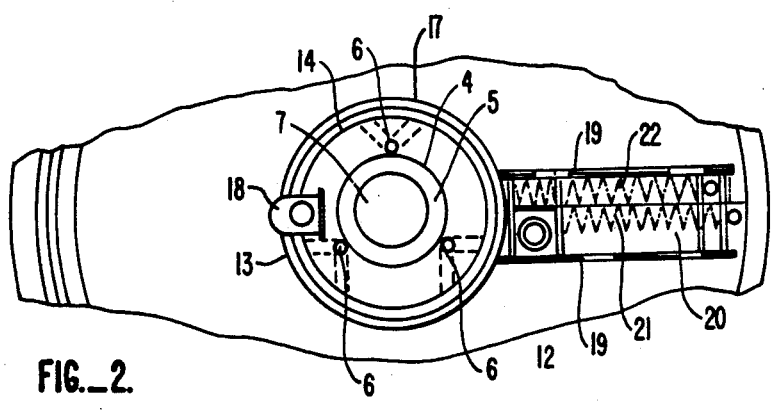
FIG._2.

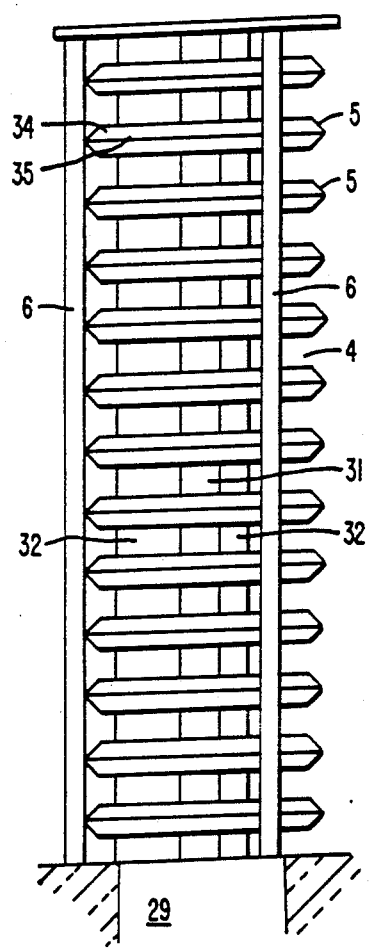
FIG._3.
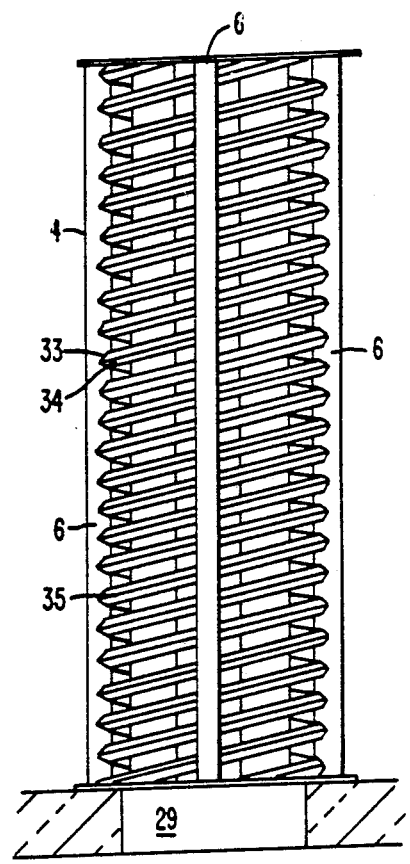
FIG._5.
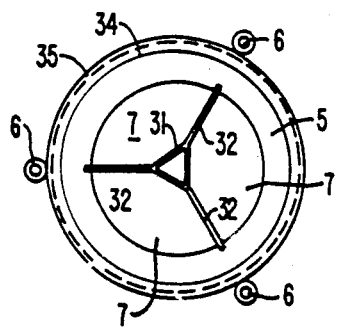
FIG._4.
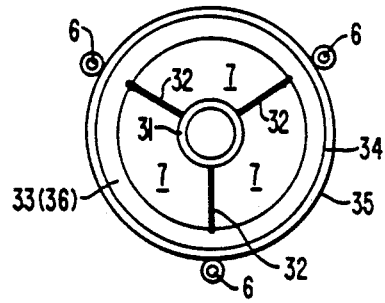
FIG._6.

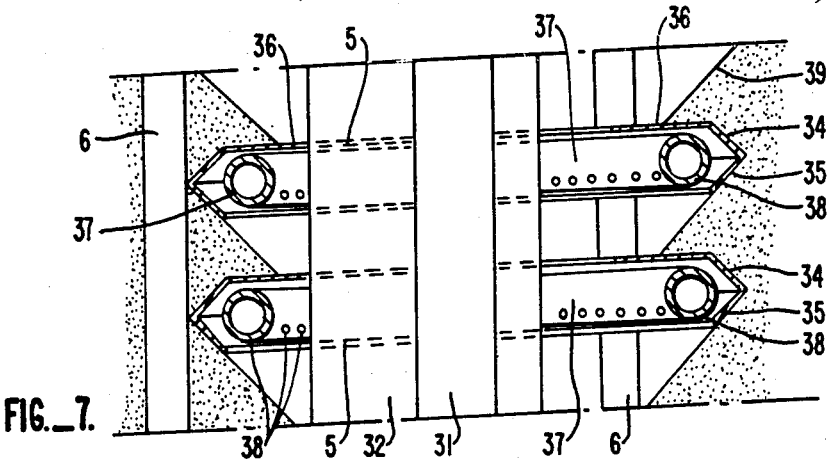
FIG._7.
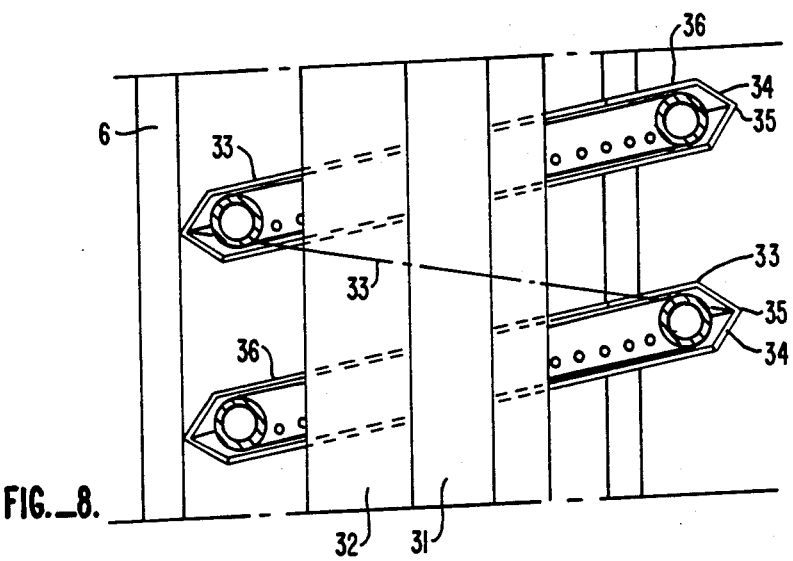
FIG._8.
FIG._9.
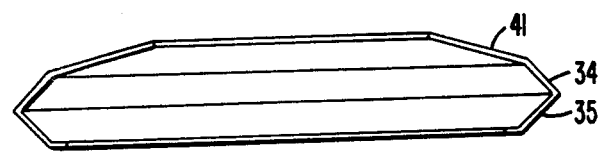
FIG._10.

CIRCULAR STORAGE CONTAINER FOR GRANULAR MATERIALS WITH A VERTICALLY MOVABLE LATERAL CONVEYOR

BACKGROUND OF THE INVENTION

The invention relates to a circular storage container for granular materials (hereafter sometimes "fill") having a central support column. A top-loading filling device is rotatable about the central axis and vertically movable along the column. A lateral conveyor is rotatable about the column and connected to the filling device via a telescopic, vertically extendable feed pipe. The support column, constructed of ring plates, has a central discharge shaft and guide rails affixed to its exterior for a hoisting and rotating apparatus, and the ring plates have a downward-slanting, wedge-shaped outer edge section.

In known large-scale silos of this type as disclosed in the Dutch patent application No. 8103486 a filling device and a crane bridge together with the lateral conveyor revolve around the central axis of the silo. The granular material drops through a feed pipe, which extends to a level just above the top of the fill in the silo, and is moved radially outward by the horizontal lateral conveyor. The lateral conveyor remains in a horizontal position as it is raised with the rising level of fill in the silo.

For removing the fill from the silo both screws of the lateral conveyor are counterrotated to draw the fill radially inward to where it drops past the ring plates through a central discharge shaft for further removal by a third screw conveyor. The ring plates are vertically spaced, arranged to define the central column and each has a horizontal surface of sufficient width so that the granular material thereon comes to rest in the form of the alluvial cone for the material in question. Thus, the material drops into the discharge shaft only when forced radially inward by the double screw conveyor.

The ring plates are reinforced by a downward-slanting outer edge. This can cause clogging when the lateral conveyor forces the granular material against the slanted edge during the removal process. Consequently, support columns constructed of ring plates, though proven to be highly advantageous as compared with other constructions serving the same purpose, are suited only for granular materials of the kind which do not tend to agglomerate.

SUMMARY OF THE INVENTION

Therefore, it is an object of the present invention to construct a silo with a support column constructed of ring plates adapted to be used with granular materials which has a tendency to agglomerate.

In accordance with the present invention this objective is achieved by providing a ring plate which, in cross-section, defines an angular outer edge section the apex of which projects radially outward.

The angular edge section facing the granular material advantageously diverts the material during the removal process into the spaces between the ring plates. This prevents material accumulations in front of the angular or wedge-shaped edges which could otherwise result in clogging.

For an efficient diversion of the material into the spaces above and below the ring plates the apex of the angle is disposed approximately at the mid-point of the outer edge section.

The ring plates have annular surfaces which may be concave or convex to take account of the alluvial cone. A concave surface results in a decreased angle of slope of the granular material, while a convex surface yields a correspondingly greater slope angle. In addition, a helically coiled band may be positioned inside the support column to eliminate the need for numerous ring plates and render the column torsionally more rigid and more resistant to buckling.

To dislodge material, such as ash, which may agglomerate, at the spaces between the ring plates, it is helpful to place a ring- or coil-shaped blow duct under the upper annular surface of the ring plates or the coil-shaped band. The duct has air discharge openings directed at the annular surface directly beneath where the granular material comes to rest.

The ring plates or coil-shaped band may be readily reinforced by attaching to them interiorally positioned, radially oriented, vertical stiffening plates. The stiffening plates can be secured to a central pipe which can also be used as an access shaft. For an efficient force transfer the guide rails for the hoisting and rotating mechanism are preferably attached to the exterior of the ring plates, or the coil-shaped band, in radial alignment with the stiffening plates.

Several embodiments of the invention are shown in greater detail in the drawings, in which:

BRIEF DESCRIPTION OF THE DRAWINGS

FIG. 1 shows a side elevational view of the silo in cross-section,

FIG. 2 shows a plan view of the silo, in cross-section, along line I—I;

FIG. 3 shows a central support column with ring plates;

FIG. 4 shows a horizontal plan view of the central support column of FIG. 3, in cross-section;

FIG. 5 shows a central support column constructed of a coil-shaped band;

FIG. 6 shows a horizontal plan view of the central support column of FIG. 5, in cross-section;

FIG. 7 shows a partial, enlarged schematic view of the central support column of FIG. 3;

FIG. 8 shows a partial, enlarged schematic view of the central support column of FIG. 5; and FIGS. 9 and 10 are two modified embodiments of the ring plates.

DESCRIPTION OF THE PREFERRED EMBODIMENTS

The embodiment shown in FIGS. 1 and 2 comprises a large silo or container, typically of a diameter of 8–16 m or more and of a height of 20 m or more. The silo is circular and has a cylindrical wall, a floor 2 and a roof 3. Large silos of this type find ever increasing use where, on the one hand, the environment must be protected against the dispersal of granular material by wind and where, on the other hand, the contents of the silo must be protected, or when particularly dense granular material must be temporarily stored At the vertical central axis of the silo is a support column 4, constructed of ring plates 5. Affixed to the outside of the support column 4 are guide rails 6 for a hoisting and rotating apparatus 13. On the inside of the support column the ring plates 5 form a discharge shaft 7.

Located coaxially above the support column 4 is an intake pipe 8 and below it is a filling device 9, having a cantilevered screw conveyor 10 which is rotatable about the central axis by means of a rotating mechanism 11. Attached to the outer end of screw conveyor 10 is a telescopic, vertically extendable feed pipe 12.

The hoisting and rotating apparatus 13, is movable along guide rails 6 on the outside of support column 4 and it comprises a hoist 14 and rotation device 17. The hoist 14 is suspended from two cables 16 which are driven by a winch 15. The rotation device 17 rotates around the vertically movable hoist 14 by means of a rotating mechanism 18. A cantilever, constructed of two parallel sections and fixedly mounted to the rotation drive 18 carries a lateral screw conveyor 20. The two screws 21 and 22 of conveyor 20 rest horizontally on top of the granular material already in the silo and convey the material radially inward or outward depending upon the direction of rotation. To support their end weight the cantilever 19 and lateral conveyor 20 are suspended as a unit from a carrier bridge 25 by means of a cable 23 connected via a roller 24 to the winch hoist 15. The outer edge of the carrier bridge moves on a roller 28 along a circular crane track 27 supported by a bracket 26 secured to the inside of the silo wall. To achieve a force equiibrium the cantilever 19 is hingeably supported on a pivot 30' of the rotation device 17. Located in the floor 2 beneath the support column 4 is a discharge opening 29 and a removal apparatus 30.

To fill the silo 1 granular material is fed from above into the intake pipe 8 of the filling device 9. From there screw conveyor 10 moves the material into the vertical feed pipe 12, where it drops down onto the lateral conveyor 20. The lateral conveyor 20 then moves the material radially outward and, as it is rotated about the central axis of the silo, disperses it over the entire cross-section of the silo. The filling device 9, the bridge carrier 25 and the rotating member 17 of the hoisting and rotating apparatus are rotated synchronously in the same direction. Thus the lateral conveyor 20 is always vertically beneath screw conveyor 10. After each complete revolution the hoisting and rotating apparatus 13 is raised one fill level. Material dropped in the vicinity of the support column 4 slides onto the ring plates 5 in accordance with its alluvial cone, but cannot drop into the discharge shaft 7.

For removing the fill from the silo the direction of rotation of screws 21 and 22 of the lateral screw conveyor 20 is reversed, thereby moving the material radially inward and forcing it through the ring plates 5, from where it drops into discharge shaft 7. During the removal of material from the silo, filling device 9 and rotation device 17 of the hoisting and rotating apparatus 13 operate synchronously. Hoist 14 is lowered level by level as the material is discharged.

FIGS. 3 and 4 show a support column 4 constructed of ring plates 5. The individual ring plates 5 are secured to vertical stiffening plates 32 mounted inside the support column and to tubular guide rails 6 mounted to the outside of the column. On the inside of the support column stiffening plates 32 are attached to and extend radially from a coaxial pipe 31. Referring to FIG. 4, the guide rails 6 are mounted on the outside of the ring plates 5 and they are radially aligned with the vertical stiffening plates 32.

Referring to FIGS. 3 and 4, the horizontal ring plates 5 have a downward-slanting wedge-shaped outer edge section 34, angular in cross-section, with the apex of the angle facing radially outwardly. The angular edge section extends around the entire circumference of the ring plates 5. As shown in FIG. 7 the fill drops or flows along the slope of the alluvial cone for the material being handled onto the annular surface 36 of the ring plates and, due to the width of the annular surface, comes to rest thereon without flowing into the discharge shaft 7. The spacing of the ring plates 5 and the width of the annular surfaces 36 are dimensioned accordingly. Slope 39 of alluvial cone in FIG. 7, for example, is set at an angle of 45°. During the removal process the granular material is moved radially inward by the lateral conveyor 20 and is diverted into the spaces between the ring plates 5 by the angular edge section 34. The angular outer edge section of the ring plates 5 prevent the formation of compression zones which could lead to a clogging of the material. For an efficient diversion of the material the apex 35 of the angle is disposed approximately at the vertical midpoint of the outer edge section 34.

To loosen agglomerated or settled material around the ring plates 5, circular blow ducts 37, as shown in FIG. 7, may be positioned beneath the annular surface 36 of the ring plates 5. The ducts have air openings 38 aimed at the support surface for the granular material directly beneath the blow pipe.

The advantages of an angular outer edge section 34 may also be realized in a support column 4, constructed of a helically coiled band 33, rather than of many ring plates 5, as shown in FIGS. 5,6 and 8. In this alternative embodiment the coiled annular surface 6 is sloped upwards in relation to the central axis, and a correspondingly coiled blow duct (not shown in FIG. 8) may also be provided.

Further modifications of the ring plates 5 are shown in FIGS. 9 and 10. The embodiment of FIG. 9 has a concave surface 40, while the annular surface 41 in FIG. 10 is convex. These modifications can also be utilized in a support column constructed of a coiled band 33, and they may also include blow ducts 37.

What is claimed is:

1. A generally circular storage container for granular materials comprising an upright support column defining a vertical axis of the container and a central discharge shaft, the column including means forming generally radially oriented access openings communicating an interior of the container with the discharge shaft, the means forming the access openings including generally ring-shaped edge sections at vertically spaced apart locations along the column, the edge sections having an angular cross-section relative to the vertical plane and an apex which faces radially outwardly so that the access openings are located between adjoining edge sections, the means forming the access openings further defining an annular surface adapted to support granular material thereon, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, an extendable feed pipe for directing granular material from the filling device to the lateral conveyor, and a blow duct positioned beneath the annular surface having air discharge openings oriented for discharging air in a generally downward direction onto granular material located beneath the blow duct.

2. A generally circular storage container according to claim 1 wherein the means forming the access openings are defined by a helically coiled member.

3. A generally circular storage container according to claim 1 wherein the blow duct has a generally circular configuration.

4. A generally circular storage container according to claim 1 wherein the blow duct has a generally helically coiled configuration.

5. A generally circular storage container according to claim 1 including a plurality of substantially vertical, radially oriented stiffening plates secured to the means forming the access openings and extending therefrom towards the axis of the container.

6. A generally circular storage container according to claim 5 including a generally vertically oriented pipe coaxially disposed within the discharge shaft defined by the column, and wherein the stiffening plates extend from the means forming the access openings to the pipe and are secured to the pipe.

7. A generally circular storage container for granular materials comprising an upright support column defining a vertical axis of the container and a central discharge shaft, the column including means forming generally radially oriented access openings communicating an interior of the container with the discharge shaft, the means forming the access openings including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access openings are located between adjoining edge sections, said legs defining, in cross-section relative to the vertical plane, angularly inclined surfaces which converge at the apex and wherein, in same cross-section, the length of the legs is about equal, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filing device to the lateral conveyor.

8. A generally circular storage container for granular materials comprising an upright support column defining a vertical axis of the container and a central discharge shaft, the column including means forming generally radially oriented access openings communicating an interior of the container with the discharge shaft, the means forming the access openings including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access openings are located between adjoining edge sections, said apex defined in cross-section relative to the vertical plane by first and second angularly inclined surfaces and spaced approximately equally from ends of the inclined surfaces remote from the apex, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filling device to the lateral conveyor.

9. A generally circular storage container for granular materials comprising an upright support column defining a vertical axis of the container and a central discharge shaft, the column including means forming generally radially oriented access openings communicating an interior of the container with discharge shaft, the means forming the access openings including an annular surface having a generally horizontal orientation, for supporting granular material, and said means further including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access openings are located between adjoining edge sections, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filling device to the lateral conveyor.

10. A generally circular storage container for granular materials comprising an upright support column defining a vertical axis of the container and a central discharge shaft, the column including means forming generally radially oriented access openings communicating an interior of the container with the discharge shaft, the means forming the access openings including an annular surface, sloping downwardly towards the axis of the container, for supporting granular materials, said means further including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access openings are located between adjoining edge sections, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filling device to the lateral conveyor.

11. A generally circular storage container for granular materials comprising an upright support column defining a vertical axis of the container and a central discharge shaft, the column including means forming generally radially oriented access openings communicating an interior of the container with the discharge shaft, the means forming the access openings including an annular surface, sloping upwardly towards the axis of the container, for supporting granular materials, said means further including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access openings are located between adjoining edge sections, a plurality of generally upright guide rails mounted to an exterior of the column, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filling device to the lateral conveyor.

12. A generally circular storage container for granular materials comprising an upright support column defining a vertical axis of the container and a central discharge shaft, the column including means forming generally radially oriented access openings communicating an interior of the container with the discharge shaft, the means forming the access openings including generally ring-shaped edge sections at vertically spaced apart locations along the column, the edge sections having an angular cross-section relative to the vertical plane and defining first and second legs which are angularly inclined with respect to each other and which meet at an apex which faces radially outwardly so that the access opening are located between adjoining edge sections, a plurality of substantially vertical, radially oriented stiffening plates secured to said means forming the access openings and extending therefrom towards the axis of the container, a plurality of generally upright guide rails mounted to an exterior of said means forming the access openings, wherein each guide rail is in radial alignment with a stiffening plate, a filling device disposed proximate an upper end of the column including means for rotating it about the container axis, a lateral conveyor extending in a generally radial direction from proximate the column towards a periphery of the container, means in engagement with the guide rails and connected to the lateral conveyor for rotating the lateral conveyor about the column axis and for moving it in a generally vertical direction along the guide rails, and an extendable feed pipe for directing granular material from the filling device to the lateral conveyor.

* * * * *